United States Patent
Hübner

(10) Patent No.: US 10,250,164 B2
(45) Date of Patent: Apr. 2, 2019

(54) INERTIAL DRIVE

(71) Applicant: PHYSIK INSTRUMENTE (PI) GMBH & CO. KG, Karlsruhe (DE)

(72) Inventor: Reinhard Hübner, Waldbronn (DE)

(73) Assignee: PHYSIK INSTRUMENTE (PI) GMBH & CO. KG, Karlsruhe (DE)

(*) Notice: Subject to any disclaimer, the term of this patent is extended or adjusted under 35 U.S.C. 154(b) by 205 days.

(21) Appl. No.: 15/127,939

(22) PCT Filed: Mar. 18, 2015

(86) PCT No.: PCT/DE2015/100113
§ 371 (c)(1),
(2) Date: Sep. 21, 2016

(87) PCT Pub. No.: WO2015/139691
PCT Pub. Date: Sep. 24, 2015

(65) Prior Publication Data
US 2017/0099017 A1 Apr. 6, 2017

(30) Foreign Application Priority Data
Mar. 21, 2014 (DE) .................. 10 2014 205 280

(51) Int. Cl.
*H02N 2/02* (2006.01)
*H02N 2/04* (2006.01)

(52) U.S. Cl.
CPC ............. *H02N 2/043* (2013.01); *H02N 2/025* (2013.01); *H02N 2/026* (2013.01)

(58) Field of Classification Search
CPC ......... H02N 2/043; H02N 2/026; H02N 2/025
See application file for complete search history.

(56) References Cited

U.S. PATENT DOCUMENTS 4,647,808 A * 3/1987 Shibuya .................. H01L 41/09
310/328
5,059,850 A * 10/1991 Yoshimura ............ H01L 41/053
310/328
(Continued)

FOREIGN PATENT DOCUMENTS

CN 101071998 11/2007
CN 103023374 4/2013
(Continued)

OTHER PUBLICATIONS

International Search Report for PCT/DE2015/100113 dated Jul. 3, 2015 with English translation; 8 pages.

*Primary Examiner* — J. San Martin
(74) *Attorney, Agent, or Firm* — Harness, Dickey & Pierce, P.L.C.

(57) ABSTRACT

An inertial drive is disclosed, comprising a length-changeable actuator element (I), a frame element (4) with a support section and with a deformation section, against the contact surfaces of which the actuator element bears, wherein the deformation section has an articulation section (13), a flat spring element (5) which is arranged on the deformation section and has a friction section (3) at the free end thereof, and a friction body (2), which can be driven, in mechanical contact with the friction section. A change in length (S) of the actuating element causes a rotatory movement (D) of the deformation section about the articulation section, which movement is transmitted via the spring element to the friction section for driving the friction body which can be driven.

12 Claims, 5 Drawing Sheets

(56) References Cited

U.S. PATENT DOCUMENTS

Figure 1:
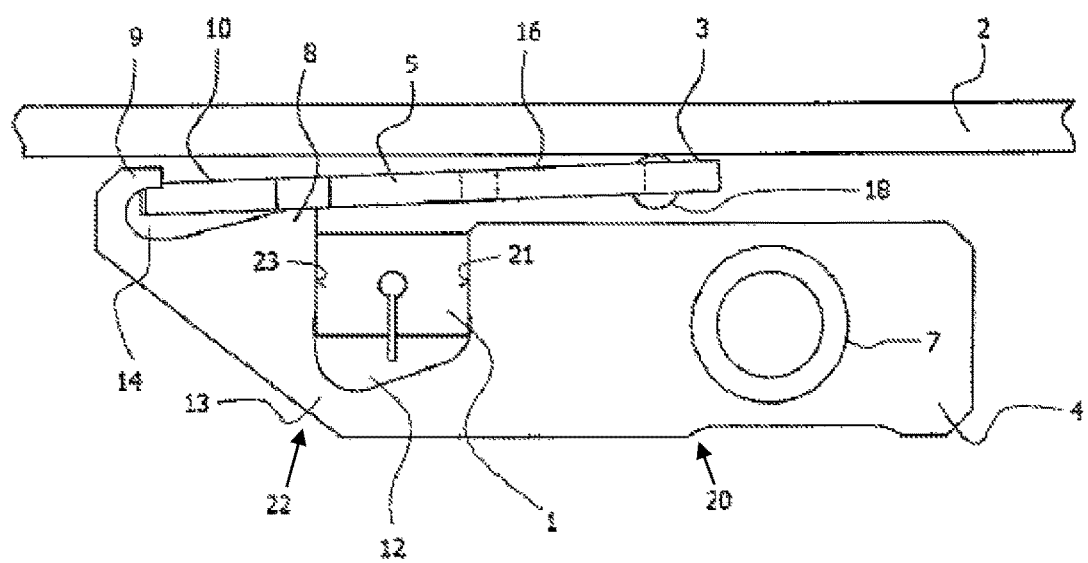

| | | | |
|---|---|---|---|
| 8,520,327 B2 * | 8/2013 | Thomas | G02B 7/08 |
| | | | 359/811 |
| 9,312,790 B2 * | 4/2016 | Culpi | H02N 2/006 |
| 2007/0176514 A1 | 8/2007 | Lei et al. | |
| 2011/0175489 A1 * | 7/2011 | Wischnewskij | G02B 7/10 |
| | | | 310/323.02 |
| 2012/0013999 A1 * | 1/2012 | Thomas | G01B 7/16 |
| | | | 359/811 |
| 2012/0026613 A1 | 2/2012 | Suzuki et al. | |
| 2015/0200610 A1 * | 7/2015 | Yamasaki | H02N 2/026 |
| | | | 359/824 |
| 2017/0366105 A1 * | 12/2017 | Yamamoto | H02N 2/006 |

FOREIGN PATENT DOCUMENTS

| | | | |
|---|---|---|---|
| DE | 102011109590 A1 | 2/2013 | |
| WO | 2008/087469 | 7/2008 | |
| WO | 2015/036545 | 3/2015 | |
| WO | WO 2015104402 A1 * | 7/2015 | H02N 2/025 |

\* cited by examiner

INERTIAL DRIVE

CROSS-REFERENCE TO RELATED APPLICATIONS

This application is a National Stage of International Application No. PCT/DE2015/100113, filed Mar. 18, 2015 and claims the benefit and priority of DE 10 2014 205 280.7, filed Mar. 21, 2014. The entire disclosures of each of the above applications are incorporated herein by reference.

FIELD

The invention relates to an inertial drive.

BACKGROUND

This section provides background information related to the present disclosure which is not necessarily prior art.

Inertial drives are known from the prior art, for example from WO2008/087469 A2. Such inertial drives comprise, in particular, stick-slip drives, that is to say drives which are distinguished by a continuously repeating alternation between a stick phase, in which the element to be driven is driven along by the movement of the driving element, and a slip phase, in which the element to be driven and the driving element slide against one another, and the element to be driven is presently not driven along, or is driven along only negligibly, by the movement of the driving element.

In the case of piezoelectric stick-slip drives, a piezoelectric actuator element is charged with a periodic voltage, in particular a high-frequency sawtooth voltage. The high-frequency expansion and contraction of the actuator element effected by the voltage is transmitted, via a friction element arranged on said actuator element, to a friction body such that the friction body is moved during a deflection of the actuator element in a stick phase, in which static friction exists between the friction element and the friction body, whereas, in a slip phase, sliding friction exists between the friction element and the friction body, such that the friction body is not driven along, or is driven along only to a very minor extent, by the movement of the friction element.

During the stick phase, the acceleration or the movement speed of the actuator element is in this case configured such that, owing to the forces that act in the frictional contact between the friction element and friction body, there is no resulting sliding friction or only negligible resulting sliding friction, such that the friction body is in any case driven along by the friction element as a result. By contrast, in the slip phase, the acceleration or movement speed of the actuator element is so high that the forces in the frictional contact between friction element and friction body are no longer sufficient for the friction element to drive the friction body along, and, owing to the inertia of the friction body, a relative movement between the friction element and friction body (that is to say sliding) occurs. Owing to the repeating sequence of the above-depicted movement processes, which lead to only a very short movement travel of the friction body per stick-slip cycle, the overall result is a movement travel that is limited only by the length of the friction body.

There is often the boundary condition of an only very small and often limited structural space for the installation of the inertial drive depicted above into a corresponding superordinate system. Arbitrary miniaturization of the inertial drive is however not possible for numerous reasons. For example, it is necessary for the actuator element to be supported by way of one of its end sections on a relatively large mass, such that the kinetic energy of the actuator element owing to the expansion thereof is transmitted as completely as possible, and with the least possible losses, to the transmission device bearing against the opposite end section of the actuator element—generally a spring element or a spring device—such that only the transmission device is set in motion, and said motion is ultimately transmitted to the element to be driven or to the friction body. Since it is thus the case that the mass on which the actuator element is supported must not undershoot a certain value, it is also the case that the corresponding support section must not undershoot a certain size or extent.

On the other hand, the mass of the transmission device, as an accelerated mass, should be as small as possible, which would duly be advantageous for miniaturization and the transmission of movement but is implementable only to a limited extent with solutions known from the prior art. Here, the transmission unit must transmit the generally relatively high normal force in the friction pairing of friction element and friction body, transmit the actuator movement with the greatest possible rigidity, and compensate for unevennesses and fluctuations in orientation of the element to be driven.

Furthermore, the arrangements or devices known from the prior art for such inertial drives are normally of very filigree design, and are therefore normally manufactured by way of an erosive process. The transmission device can then be manufactured only from materials which have only moderate and altogether unsatisfactory spring characteristics.

The inertial drives discussed above furthermore often require a relatively high axial mechanical preload or compressive stress acting on the actuator element. In the case of miniaturized inertial drives, the application of such a force or preload is complicated and technically difficult to implement owing to the limited space conditions.

It is therefore the object to reduce or eliminate the abovementioned disadvantages of existing inertial drives. In particular, it is the object to provide an inertial drive which can be miniaturized to a significant extent and, here, functions with adequate robustness. At the same time, it is sought to make it possible for the inertial drive to be produced relatively easily and inexpensively. It is also sought to realize an inertial drive with an easily adjustable normal force with which the friction element is pressed against the element to be driven, at the same time with as high as possible an axial preload or compressive stress on the actuator element. It is sought to make this possible even in very constricted installation spaces, in conjunction with a simple construction composed of easily miniaturizable elements.

The above-stated objects are achieved by way of an inertial drive comprising at least expedient embodiments and refinements.

Accordingly, an inertial drive having a frame element and having a variable-length actuator element, preferably a piezoelectric actuator element, inserted into the frame element is taken as a starting point. Here, the frame element has a support section with a support surface, against which the actuator element bears by way of one of its two opposite end sections or by way of the corresponding end surface. Furthermore, the frame element has a deformation section with an abutment surface against which the actuator element bears by way of the other end section or by way of the corresponding end surface. The deformation section of the frame element furthermore has a joint section which is provided primarily for mounting the deformation section movably relative to the support section. A flat, elongate and preferably planar spring element is arranged or fastened by way of its ends on the deformation section of the frame element, wherein the spring element has a friction section on its opposite free end. Furthermore, the inertial drive has a friction body for being driven, which friction body is in direct or indirect mechanical or frictional contact with the friction section. The variation in length of the actuator element gives rise here to a rotational movement of the deformation section about the joint section, and said movement is transmitted via the spring element to the friction section for the purposes of driving the friction body for being driven, wherein the friction section is arranged spaced apart from the abutment surface in a direction pointing away from the abutment surface. In this context, and likewise in the context of the further description, "spaced apart" refers to a positive, non-zero spacing. In the present context, the expression "in a direction pointing away from the abutment surface" describes a direction which points away from the abutment surface in the direction of the support surface, such that the friction section is arranged either in the region in which the actuator element is also situated, and is then correspondingly situated opposite said actuator element, or else the friction section is arranged behind the actuator element or behind the support surface in the direction pointing away from the abutment surface in the direction of the support surface.

Owing to the specific arrangement or position of the friction section, which is not arranged spaced apart from the actuator element or spaced apart from the abutment surface in a direction pointing away from the support surface and pointing toward the abutment surface in the manner known from the prior art, but which is arranged either in the region of the actuator element, and thus so as to be situated opposite the latter, or behind the actuator element, and spaced apart therefrom, or behind the support surface, in the direction pointing away from the abutment surface and in the direction of the support surface, it is the case, for a given structural space for the inertial drive, that significantly greater design freedom is provided with regard to the frame element. In this way, the geometric extent and thus the mass of the support section can be selected to be relatively large despite the generally small installation dimensions, which benefits the optimized operation of the inertial drive. The force generated by the actuator element acts with the same magnitude on the support and deformation sections. If the actuator element changes in length and thus performs work, energy is transmitted into the support section and into the deformation section. Here, the amount of energy transmitted corresponds to the reciprocal mass ratio of the elements involved. The lighter the deformation section and spring element are in relation to the support section, the more energy is ultimately transmitted to the friction section of the spring element, and the less energy flows in an undesired manner into the support section.

Through the use of a flat, generally planar and elongate spring element, considerably simplified production of the inertial drive according to the invention in relation to the prior art is realized. Furthermore, the spring element and the specific arrangement thereof within the inertial drive permits targeted adjustment of the preload or compression force acting on the actuator element inserted in the frame element. This applies equally to the normal force acting on the friction section in the direction of the element to be driven. The targeted adjustment of said forces is essential for the reliable operation of the inertial drive.

It may be advantageous for the mass of the support section to amount to at least five times the mass of the deformation section. With such a mass ratio, the change in length of the actuator element or the corresponding force is converted in an effective manner, virtually without losses, into a movement of the deformation section, wherein only a negligible (opposite) movement of the support section is generated as a result. Here, the higher the mass of the support section in relation to the deformation section, the more effective the above-described deformation or conversion of movement.

It may likewise be advantageous for the joint section to be formed in one piece with the frame element and to form a flexure joint. In this way, the joint section can be realized in a very small size and with little usage of material. Aside from the desired small dimensions, the mass to be moved in the deformation section is thereby kept small. For piezoelectric actuators with typically short strokes and high forces, flexure joints are particularly advantageous because they operate without friction and transmit very high forces with minimal hysteresis.

It may also be advantageous for the frame element and the spring element to be arranged relative to one another such that the spring element has a permanent preload directed toward the surface of the friction body, and said preload is transmitted via the frame element to the actuator element and effects a permanent pressure load on the actuator element, which pressure load is adjustable by way of the deformation of the spring element. It is thus possible in a relatively simple manner for both the preload directed toward the surface of the friction body and the pressure load acting on the actuator element to be adjusted. The adjustment of the preload directed toward the surface of the friction body, or the corresponding normal force, is in this case important for the frictional contact between the friction section of the spring element and the friction body. The compression force acting on the actuator element must be dimensioned such that any tensile force acting on the actuator element is always lower than the applied compression force.

It may furthermore be advantageous if the frame element has a counterbearing section and a bearing section, wherein the spring element lies on the bearing section, and the section of the spring element between the counterbearing section and the bearing section forms a clamping section with a non-zero clamping length Ls.

It may furthermore be advantageous if the spring element forms, between the bearing section and the friction section, a spring section with a non-zero spring length $L_F$, and the spring length is at least twice the clamping length.

It may furthermore be advantageous if the compression force acting on the actuator element is at least as high as the normal force acting on the friction body and/or on the friction section. The optimum actuator preload is in this case dependent on the actuator type, but is typically considerably higher than the material-dependent optimum normal force in the friction pairing of friction section and friction body. The actuator preload is correspondingly dimensioned in order to protect the actuator element against tensile stresses. In the case of the inertial drive according to the invention, in particular as loading of the inertial drive increases, i.e. as the speed of the variation in length of the actuator element increases, so does its protection against tensile stresses. Inadvertent destruction of the actuator element during the assembly process is made less likely.

Furthermore, it may be advantageous if the spring element is provided as a separate element, and the counterbearing section is designed such that the spring element can abut against it in a supporting manner. This facilitates the production of the inertial drive and permits design modifications in a simple and inexpensive manner. Under some circumstances, it is sufficient here for the spring element to merely bear against the counterbearing section without an engaging action or engaging-behind action or other fastening being realized, such that the corresponding surfaces are pressed against one another.

Here, the clamping length $L_S$ has a major influence on the normal forces generated in the bearing section and counterbearing section. Adequately high normal forces in the bearing section and in the counterbearing section secure the separate spring element against slippage, and permit the reliable transmission of the movement of the actuator element to the friction section.

Furthermore, the ratio of spring length to clamping length has a major influence on the resulting friction forces on the counterbearing section and on the bearing section, which friction forces, in the case of typical friction coefficients of the friction pairing of spring element and frame element, reliably prevent slippage of the separate spring element on the corresponding bearing points.

It may furthermore be advantageous if the spring element has a width which varies over its length, wherein the width within the clamping section increases from the receiving section to the bearing section, and the width narrows at least in sections proceeding from the bearing section in the direction of the friction section. The increasing width within the clamping section gives rise, in said region, to adequately firm clamping of the spring element in the frame element. An aim of the variation of the width of the spring element is the realization of as large as possible a region of homogeneous stress distribution within the spring element. The larger the region of homogeneous stress distribution that can be realized, the more flexible the spring element becomes, that is to say the greater the bend angle of the spring element that can be selected. In the case of a typical design of the inertial drive according to the invention, for a given normal force on the friction section of the spring element, the deformation of said spring element amounts to approximately 100 times the actuator stroke. As a result, the deflection of the actuator element during operation gives rise to a fluctuation of the normal force by only ±1%.

It may furthermore be advantageous if the width of the spring element has a minimum between the bearing section and the friction section. In order to realize as large as possible a region of homogeneous stress distribution, as already described above, the spring element becomes wider toward the receiving section. However, it is also the case that the stability of the spring element should increase in the direction of the friction section in order to follow the movements of the actuator element as directly as possible. The two demands change their priority at the minimum.

It may furthermore be advantageous if the width of the spring element is constant in the region of the bearing section. In this way, for a given normal force load, the mechanical stresses in the spring element increase around the bearing section. Under the action of the normal force, the spring element will curve more intensely locally in the bearing region. The elastic bend that is generated additionally prevents the slippage of the spring element on the bearing section.

It may moreover be advantageous if the friction section of the spring element has a friction element which is inserted into the spring element.

It may furthermore be advantageous if the ratio between the length $L_{AAFK}$ of the lever between the bearing section and the joint section and the length $L_{ASFK}$ of the lever between the center of gravity of the actuator element and the joint section lies between 1.2 and 3. With such a lever ratio, the inertial drive can be better adapted to an existing actuator. Furthermore, for the same vibration frequency of the actuator element, with a reduction of the thrust force, the speed of the inertial drive or of the element to be driven can be increased.

Furthermore, it may be advantageous if the frame element is formed in one piece with a superordinate structure that supports the frame element. This may be advantageous in the context of an integral and/or miniaturized design of the inertial drive.

SUMMARY

This section provides a general summary of the disclosure, and is not a comprehensive disclosure of its full scope or all of its features.

The inertial drive according to the invention will be discussed in more detail below on the basis of exemplary embodiments. The appended FIGS. 1 to 5 serve for illustration. The same reference designations are used for identical parts or parts of identical action.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
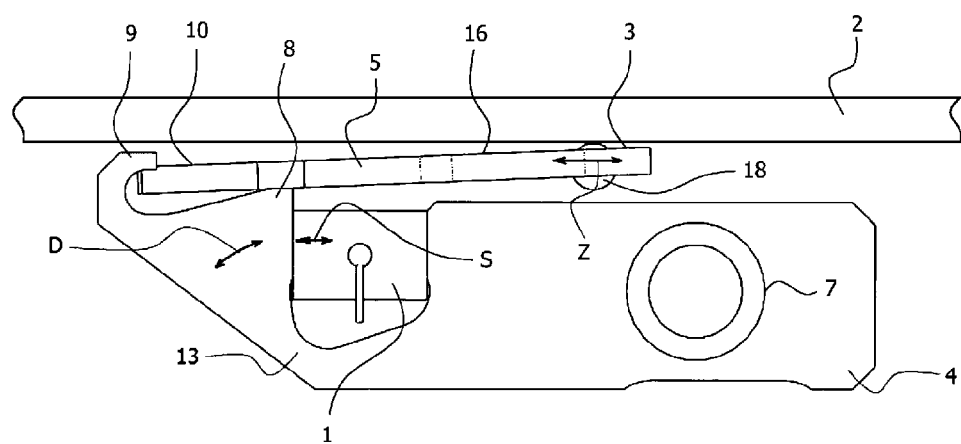
Figure 3:
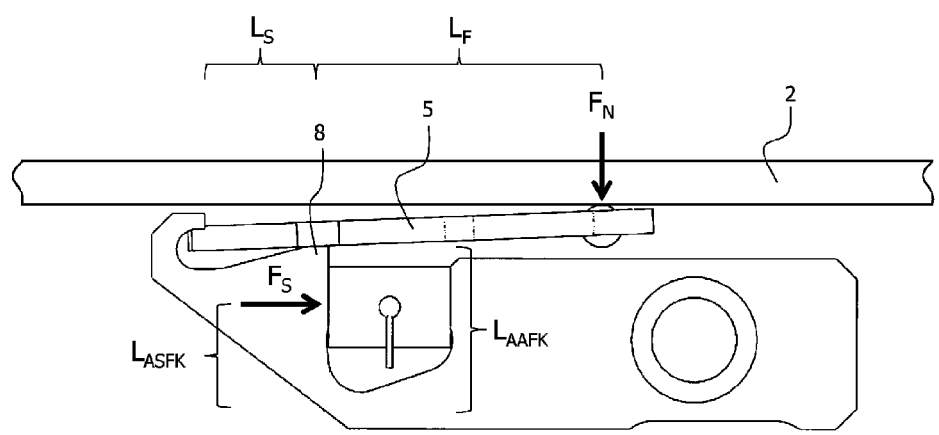
Figure 4:
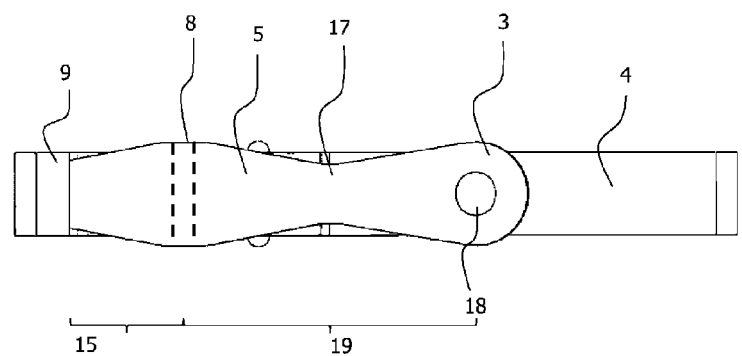
Figure 5:
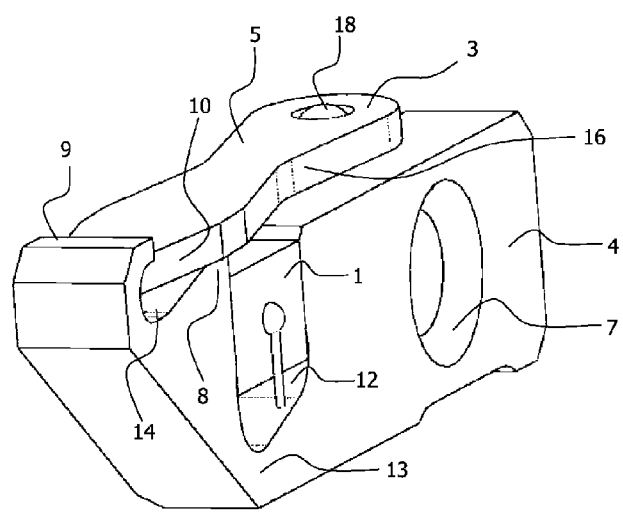

In the figures, schematically and not true to scale:

FIG. 1 shows an embodiment of an inertial drive according to the invention in an illustration from a side elevation, FIG. 2 shows the inertial drive as per FIG. 1 with an illustration of the basic movement directions of individual sections or parts, FIG. 3 shows the inertial drive as per FIG. 1 with an illustration of the acting forces and relevant lever lengths FIG. 4 shows the inertial drive as per FIG. 1 in a plan view from above, FIG. 5 shows the inertial drive as per FIG. 1 in a perspective view.

Corresponding reference numerals indicate corresponding parts throughout the several views of the drawings.

DETAILED DESCRIPTION

Example embodiments will now be described more fully with reference to the accompanying drawings.

FIG. 1 is an illustration of the inertial drive according to the invention in a side view. The inertial drive comprises a variable-length piezoelectric actuator element 1 which is inserted into a frame element 4, for which purpose the frame element 4 has a corresponding cutout 12. The frame element 4 is composed of a solid body which is formed as a milled part. Said frame element is composed of an easily millable material, in particular of so-called machining steel.

The frame element has a support section 20 with a bore 7, wherein the bore is provided for the insertion of an assembly screw or of a similar fastening means such that the frame element can be fastened to a positionally fixed assembly frame (not illustrated here). It is however likewise conceivable for the frame element to be integrally connected to the assembly frame and to be formed out of said assembly frame. Adjacent to the support section 20, the frame element has a deformation section 22, wherein the support section 20 has a support surface 21 on which the actuator element is supported by way of its two end surfaces. The deformation section 22 has an abutment surface 23 which is situated opposite the support surface 21 and against which the other end surface of the actuator element bears. Here, the actuator element is not cohesively connected to the frame element, that is to say the actuator element is merely clamped or braced between the support surface and the abutment surface. It is however likewise possible for the actuator element to be cohesively connected to the support surface and/or to the abutment surface, for example by adhesive bonding.

The deformation section has a joint section 13 which ensures that the deformation section is held or mounted movably relative to the support section. In particular, the joint section permits a rotational or tilting movement of the deformation section relative to the support section. In the embodiment as per FIG. 1, the joint section is formed in one piece with the frame element, specifically as a narrowed portion of said frame element. Aside from this, it is however likewise conceivable for the joint section to be formed by a separate joint element.

The deformation section 22 furthermore has a counterbearing section 9 which, in the embodiment as per FIG. 1, is of hook-shaped form. The deformation section accordingly has a cutout 14 which serves for the receiving or clamping of an end section of an elongate, flat spring element 5. Said separate spring element is expediently composed of a high-performance spring material, for example of rolled steel, titanium or a titanium alloy or a similar material. The spring element 5 is supported at one side on the counterbearing section 9; at the other side, the spring element 5 lies on a bearing section 8 which is arranged spaced apart from the counterbearing section. In this way, the spring element 5 forms, between the counterbearing section 9 and the bearing section 8, a clamping section with a clamping length $L_S$ (see FIG. 3).

The clamping section of the spring element 5 is adjoined by a spring section 16 with a spring length $L_F$ (see likewise FIG. 3) which extends from the bearing section 8 to the other, free end of the spring element 5, wherein the free end of the spring element 5 forms a friction section 3. The friction section is provided for direct or indirect contact with the friction body 2 to be driven. In the embodiment as per FIG. 1, the friction section 3 has a friction element 18 composed of a ceramic material, which friction element is inserted into the spring element and makes contact with the friction body, which is likewise composed of a ceramic material. Thus, in this case, the friction section makes indirect contact with the friction body. It is however likewise possible for the friction section to not have a friction element and to be in direct contact with the friction body.

The friction element is acted on by a normal force owing to the bending of the spring element between the bearing section and the friction section (that is to say in the spring region), said bending being caused by the arrangement of frame element relative to friction body. The spring force effected by said bending is transmitted by the spring element via the bearing section and the counterbearing section to the deformation section, in such a way that a tilting or rotational movement of the deformation section in the direction of the support section or toward the support section is induced. Here, an actual tilting or rotational movement is however prevented by the actuator element situated between the deformation section and support section in the cutout 12. However, there is a resulting corresponding compression force on the actuator element, such that said actuator element is clamped between the support surface 21 and the abutment surface 23.

The compression force acting on the actuator element can in this case be adjusted in a broad range. Said compression force is influenced by the material of the spring element 5, by the clamping length and/or the spring length of the spring element, and also by the geometry of the frame element, in particular of the deformation section. At the same time, the normal force that is exerted by the friction element on the friction body can also be influenced and adjusted in targeted fashion by way of the features mentioned above.

The bending of the spring element in the spring region causes the spring element, in its clamping region, to be pressed against the counterbearing section and thus clamped. At the same time, the clamping region however also imparts a spring action, which has the effect that the utilizable deformation of the spring element is increased. Furthermore, said spring action leads to a more effective decoupling between the friction section and actuator element.

The change in length caused by an application of electrical voltage to the actuator element primarily causes a movement of the deformation section relative to the support section, which performs at most a negligible movement in the opposite direction. Thus, the kinetic energy of the actuator element is transmitted almost completely to the deformation section, which performs a rotational movement about the joint section 13 in a direction pointing away from the support section. Owing to the firm clamping of the spring element between the counterbearing section and bearing section, the movement of the deformation section is transmitted to the spring element or to the friction section thereof, wherein the friction section or the friction element inserted into said friction section performs a movement whose direction runs parallel to the longitudinal orientation of the friction body. Owing to the mechanical or frictional contact between the friction element and the friction body, and the normal force exerted on the friction body by the friction element, it is the case, depending on the magnitude of the acceleration transmitted by the actuator element to the friction element, that either the friction body is driven along with the friction element (in the presence of an adequately low acceleration), or a relative movement (sliding) between the fiction element and friction body occurs (in the presence of an adequately high acceleration, such that the inertia of the friction body is relevant).

FIG. 2 serves for the explanation of the kinematics of the inertial drive as per FIG. 1. Under the influence of an external electrical alternating voltage, preferably a sawtooth voltage, the actuator element 1 performs axial vibrations S, that is to say vibrations along its longitudinal axis S. Here, said actuator element is in permanent mechanical contact with the frame element 4. The axial vibrations have the effect that the deformation section moves in the same direction. This is achieved by virtue of the fact that the deformation section 22 has a joint section 13 which is formed by a narrowed portion of the frame element 4 and which forms a flexure joint. Said flexure joint permits the movement of the deformation section relative to the support section, wherein the deformation section performs a rotary or a rotational or tilting movement D or a rotational or tilting movement D through a certain angle range. Said rotational or tilting movement of the deformation section correspondingly leads to the movement of the counterbearing section 9 and thus also to the movement of the spring element 5 clamped between the counterbearing section 9 and bearing section 8, such that the friction element 3 ultimately performs a movement Z, the direction of which is parallel to the direction of longitudinal extent of the friction body.

Here, the inertial or stick-slip drive functions such that, in the event of a slow expansion of the actuator element 1 and a correspondingly slow rotational movement D of the deformation section 22 about the joint section 13, the action of the counterbearing section 9 and of the bearing section 8 has the effect, firstly, that the spring element 5 undergoes relatively intense bending, which ensures that the friction element 3 is pressed against the friction body with a slightly elevated normal force, and secondly, there is a resulting linear movement of the friction element along the friction body, wherein said movement is so slow that, owing to the friction force that acts in the contact between the friction element and friction body, static friction prevails which ensures that the friction body follows the movement of the friction element. Ultimately, by way of the specific arrangement of the inertial drive, the rotational movement of the deformation section 22 is converted into a linear movement of the friction element 3, wherein the linear movement of the actuator element 1 is transmitted, boosted by the lever with the length $L_{ASFK}$ (in this regard, see FIG. 3), to the friction element 3. Here, the length $L_{ASFK}$ defines the spacing between the center of gravity of the actuator element and the joint section.

During the subsequent shortening of the actuator element 1, which occurs more quickly than the expansion, the deformation energy stored in the spring element 5 and in the deformation section 22 is released again. The corresponding deformations are elastically reversed. As a result, the support surface 21 and the abutment surface 23 of the frame element 4 remain in contact with the actuator element even during said shortening or contraction phase of said actuator element. Thus, the actuator body only has to impart a very low tensile force, wherein the absolute value of the tensile force is always lower than the absolute value of the compression force that acts constantly on the actuator element, such that, even when a tensile force acts on the actuator element, the actuator element is as a whole still under compressive stress. With the shortening of the actuator element 1, the deformation section also moves in the corresponding direction, and in so doing, drives the spring element along. As a result, the friction element also moves in the same direction, which is opposite to the direction during the expansion of the actuator element. Here, the normal force acting on the friction element is substantially constant. Owing to the inertia of the friction body, it is the case that, during said return movement of the spring element or of the friction element, a relative movement, that is to say sliding, between the friction element and friction body occurs, wherein the sliding friction that then prevails leads at most to a minimal and functionally non-critical displacement of the friction body counter to the drive direction.

For the function of the inertial drive, both the magnitude of the static friction acting between the friction element and the friction body (in the stick phase) and the magnitude of the sliding friction acting between said friction element and friction body (in the slip phase) are of importance. Furthermore, an adequately high compression force must act between the actuator element 1 and the frame element 4 such that the actuator element is subjected to no tensile loading, or to a negligible effect of tensile loading, during its contraction movement. Here, the inertial drive according to the invention permits a simple adjustment of the compression force acting on the actuator element.

The forces acting in the inertial drive according to the invention, or the relevant levers acting in said inertial drive according to the invention, are illustrated in FIG. 3. The normal force acting between the friction element 3 and the friction body 2 is in this case denoted by $F_N$. Said force acts via the spring lever length $L_F$. The spring lever length $L_F$ is the length of the spring element 5 between the bearing section 8 and the friction element 3. Furthermore, FIG. 3 illustrates the clamping length $L_S$ of the clamping section 10. The compression force acting on the actuator element 1 is denoted as $F_S$. Said compression force acts via a length $L_{ASFK}$, wherein $L_{ASFK}$ is the spacing between the effective center of rotation of the joint section 13 and the center of gravity of the actuator element 1. This entire arrangement of the inertial drive according to the invention acts such that a certain deformation of the spring element, and thus a certain normal force acting on the spring element, is converted into a certain compression force acting on the actuator element.

The deformation or deflection of the spring element 5 in the region of the friction element 3 is in this case typically 50 to 200 times as great as the deflection of the actuator element. This has the effect that, even in the case of unevennesses of the friction body or as a result of changes in position of the friction body perpendicular to the drive direction, owing to the mounting of said friction body, there are only insignificant and thus negligible changes in the normal force and in the actuator preload.

This means that the compression force acting on the actuator element can be adjusted entirely by way of the normal force acting on the friction body 2. As a result, the inertial drive according to the invention is particularly easy to calibrate and adjust. During the assembly of the inertial drive according to the invention, it must be ensured merely that the actuator element can be inserted with a suitable fit dimension into the frame element 5. Furthermore, said design ensures that the inertial drive as a whole can be disassembled particularly easily. As soon as the spring element is fully relaxed, the actuator element is released by the frame element, and both parts can be separated from one another very easily, without the need to overcome interference fits or compression forces. Said device also ensures that adequate degrees of freedom are provided both for the design of the spring element and for the design of the frame element. Here, the device can be adjusted in a simple manner in particular by way of the design of the spring element.

FIG. 4 shows the inertial drive according to the invention as per FIG. 1 in a plan view, that is to say in a view directed toward the spring element. The spring element 5 has, in this case, a varying width in its longitudinal direction. From the region of the counterbearing section 9 to the bearing section 8, which defines a clamping region 15, the width increases continuously. Thus, the spring element has a V shape in said region. In the region of the bearing section, the width then remains constant. As far as a central section 17 of a spring region 19 adjoining the bearing section 8, the width of the spring element decreases continuously, before thereafter increasing again toward the friction section 3, wherein the width of the spring element is approximately the same in the region of the friction section and in the region of the bearing section 8.

The relatively large width of the spring element in the region of the bearing section can be explained by the need for the most secure possible mounting of the spring element. Between the bearing section and the friction section 18, however, the spring element may be of practically any desired design. Through corresponding selection of the width profile, the stiffness of the spring element can be expediently configured and adapted.

Close to the bearing region 8, it is recommendable for the width of the spring element 5 to be kept constant. Owing to the bending moments induced at the friction element 3, the mechanical stresses in the spring element 5 thus increase toward the bearing region. The spring element curves with the greatest intensity in the region of the highest stresses. A slight bend forms without plastic deformation, which bend improves the fixing of the spring element.

FIG. 5 is a perspective illustration of the inertial drive according to the invention. The frame element 4 is basically in the form of a prismatic body. The width thereof may basically be as small as desired, wherein said width is however scaled to the overall size of the inertial drive. Said inertial drive is, owing to its relatively simple construction, very highly suitable for miniaturization. A staggered arrangement of several of the inertial drives shown is also possible, which inertial drives can, in particular by way of their bores 7, be pushed onto a common holder. The individual arrangements may also be oriented differently, wherein possible directional dependencies are compensated.

The device according to the invention has been discussed on the basis of exemplary embodiments. Further refinements are possible within the scope of the practice of a person skilled in the art. Further embodiments emerge in particular also from the subclaims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An inertial drive, comprising a variable-length piezoelectric actuator element, further comprising:
   a frame element with a support section including a support surface on which a first end section of the actuator element is supported, and with a deformation section including an abutment surface against which a second end section of the actuator element bears, said second end section being situated opposite the first end section of the actuator element, wherein the deformation section has a joint section;
   a flat spring element which is arranged on the deformation section of the frame element and which includes a friction section which forms a free end of the spring element; and
   a friction body for being driven, which friction body is in direct or indirect mechanical contact with the friction section, wherein a length change of the actuator element gives rise to a rotational movement of the deformation section about the joint section, which rotational movement is transmitted via the spring element to the friction section for the purposes of driving the friction body for being driven, wherein the friction section is arranged spaced apart from the abutment surface of the deformation section when viewed in a direction which points away from the abutment surface;
   wherein the frame element has a counterbearing section and a bearing section, wherein the spring element lies on the bearing section, and the section of the spring element between the counterbearing section and the bearing section forms a clamping section with a non-zero clamping length $L_S$ such that the spring element exerts a permanent preload directed toward the surface of the friction body, and said preload is transmitted via the frame element to the actuator element and effects a permanent pressure load on the actuator element, which pressure load is adjustable by way of the deformation of the spring element.

2. The inertial drive as claimed in claim 1, wherein the support section has a support section mass and the deformation section has a deformation section mass, wherein the support section mass amounts to at least five times the mass of the deformation section mass.

3. The inertial drive as claimed in claim 1, wherein the joint section is formed in one piece with the frame element and forms a flexure joint.

4. The inertial drive as claimed in claim 1, wherein the spring element forms, between the bearing section and the friction section, a spring section with a non-zero spring length $L_F$, and the spring length is at least twice the clamping length.

5. The inertial drive as claimed in claim 1, wherein the compression force acting on the actuator element is at least as high as the normal force acting on the friction body and/or on the friction section.

6. The inertial drive as claimed in claim 1, wherein the spring element is provided as a separate element, and the counterbearing section is designed such that the spring element can abut against it in a supporting manner.

7. The inertial drive as claimed in claim 6, wherein the spring element has a width which varies over its length, wherein the width within the clamping section increases from the receiving section to the bearing section, and the width narrows at least in sections proceeding from the bearing section in the direction of the friction section.

8. The inertial drive as claimed in claim 7, wherein the spring element has a minimum width at a position between the bearing section and the friction section.

9. The inertial drive as claimed in claim 6, wherein the width of the spring element is constant in the region of the bearing section.

10. The inertial drive as claimed in claim 6, wherein the friction section of the spring element has a friction element \ which is inserted into the spring element.

11. The inertial drive as claimed in claim 6, wherein the lever extends between the bearing section and the joint section in a length $L_{AAFK}$ and between the center of gravity of the actuator element and the joint section in a length $L_{ASFK}$, wherein the relationship of the length $L_{AAFK}$ to the length $L_{ASFK}$ lies between 1.2 and 3.

12. The inertial drive as claimed in claim 6, wherein the frame element is formed in one piece with a superordinate structure that supports the frame element.

* * * * *